Figure 1:
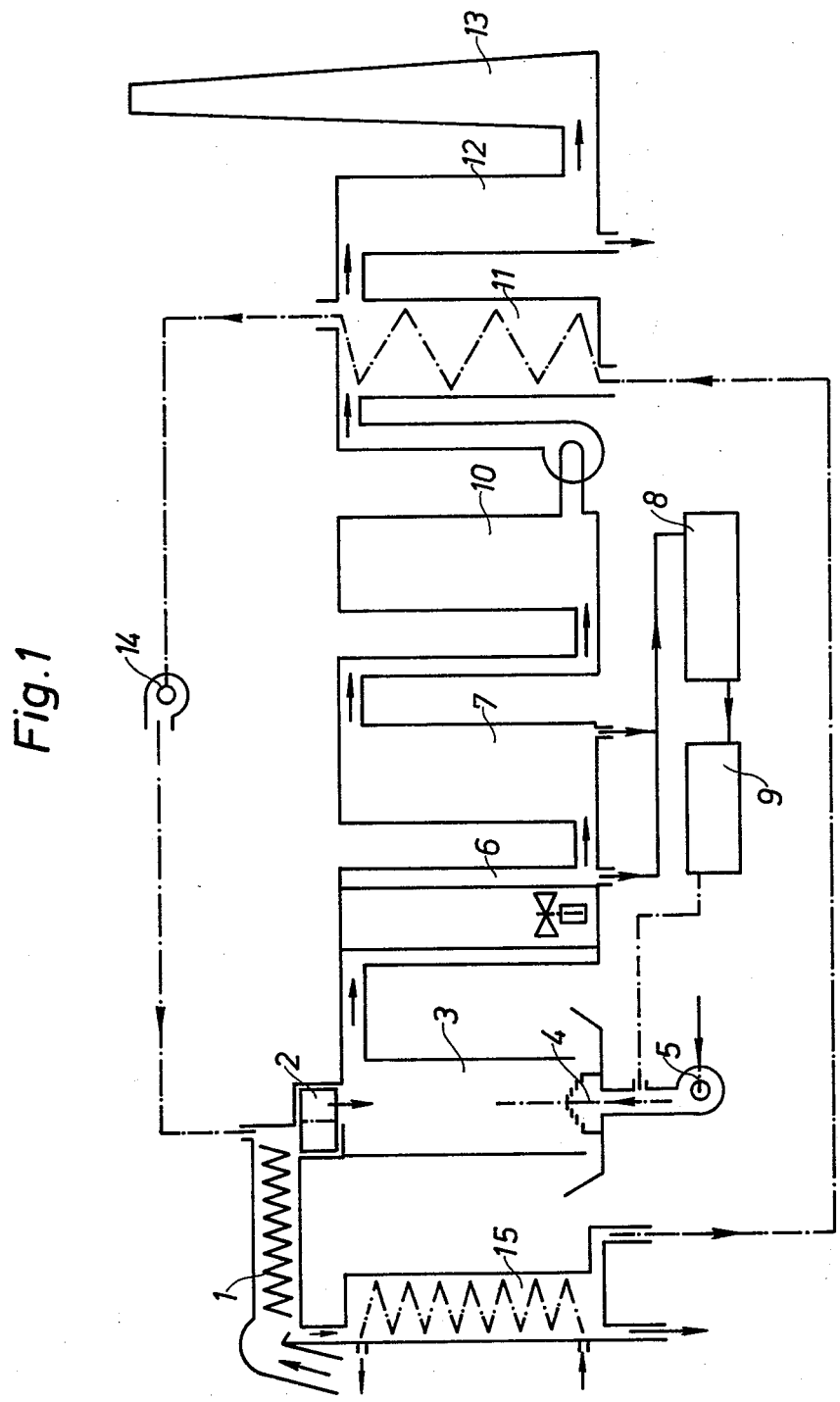

United States Patent [19]
Sundqvist et al.

[11] 3,886,873
[45] June 3, 1975

[54] METHOD IN THE DESTRUCTION OF WASTE BY GASIFICATION AND COMBUSTION

[75] Inventors: Hans Edvin Sundqvist; Karl Erik Gustav Andersson, both of Motala, Sweden

[73] Assignee: AB Motala Verkstad, Motala, Sweden

[22] Filed: June 5, 1973

[21] Appl. No.: 367,096

[30] Foreign Application Priority Data
June 15, 1972 Sweden................................ 7913/72
Dec. 15, 1972 Sweden............................. 16450/72

[52] U.S. Cl.................. 110/8 R; 110/31; 48/197 A; 201/28; 122/5
[51] Int. Cl............................................. F23b 7/00
[58] Field of Search ................ 110/7, 8, 11, 15, 31; 122/5; 48/197 A, 209; 44/1 D; 201/28, 29, 30, 37

[56] References Cited
UNITED STATES PATENTS

| | | |
|---|---|---|
| 3,303,798 | 2/1967 | Kartinen et al..................... 110/11 |
| 3,362,887 | 1/1968 | Rodgers............................ 110/11 X |
| 3,511,194 | 5/1970 | Stookey................................. 110/8 |
| 3,554,143 | 1/1971 | Rodgers et al...................... 110/15 |
| 3,697,256 | 10/1972 | Engle.................................. 110/15 |
| 3,702,039 | 11/1972 | Stookey et al....................... 48/209 |
| 3,729,298 | 4/1973 | Anderson......................... 110/8 X |
| 3,736,111 | 5/1973 | Gardner et al.................. 48/209 X |
| 3,746,521 | 7/1973 | Giddings............................. 110/31 |

*Primary Examiner*—Kenneth W. Sprague
*Attorney, Agent, or Firm*—Wigman & Cohen

[57] ABSTRACT

This disclosure relates to a method of destroying waste by combustion. The waste is first gasified in a gas generator and the gaseous products then delivered to a combustion chamber for combustion thereof. Prior to delivery of the gaseous products to the combustion chamber, the water-soluble compounds are separated therefrom by means of a cooler and an electrostatic filter, and returned to the gas generator prior to combustion thereof.

4 Claims, 5 Drawing Figures

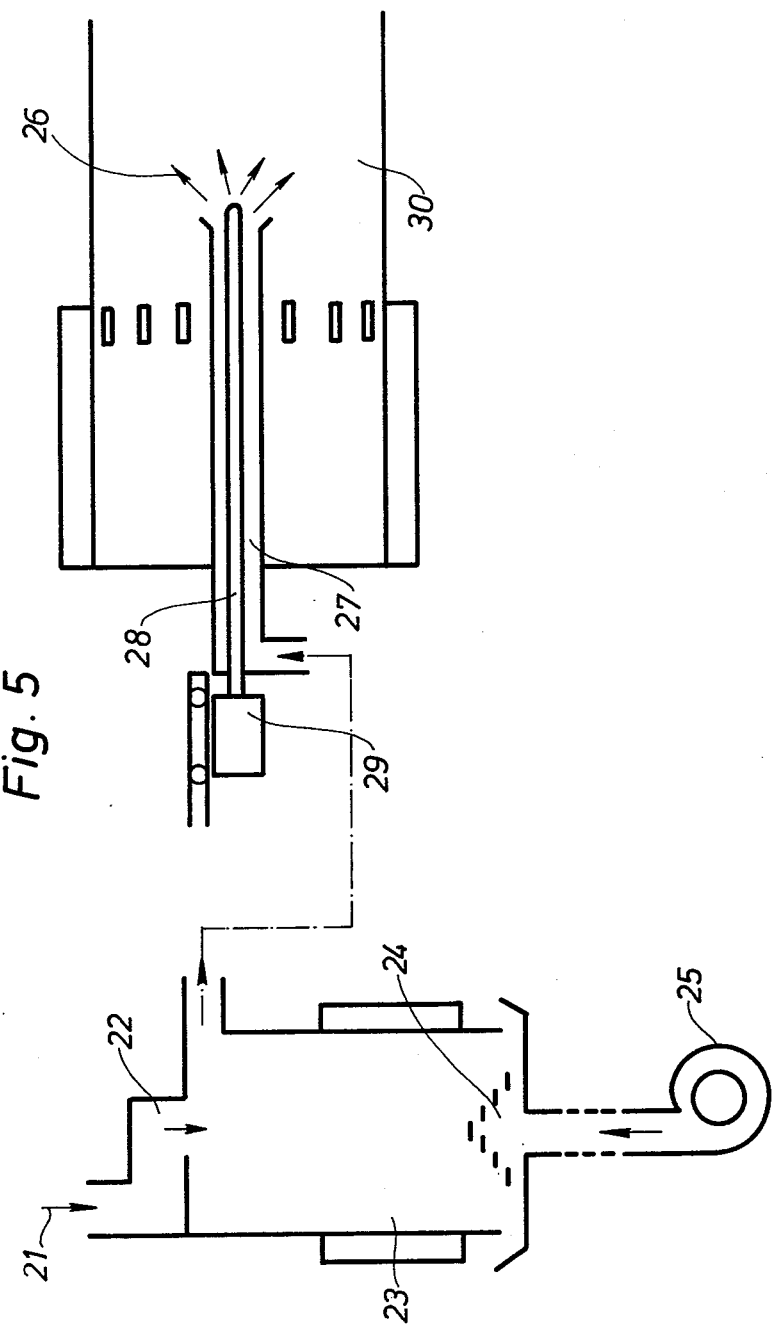

METHOD IN THE DESTRUCTION OF WASTE BY GASIFICATION AND COMBUSTION

The present invention relates to a method in the destruction of waste with which waste, such as garbage, bark and sewage sedimentation sludge for example, is gasified and burned and the potential heat content of the waste is utilized in an economically favourable manner whilst, at the same time, hydrocarbons such as phenols dissolved in water separated from the waste are prevented from being discharged to the surroundings and from creating environmental problems in the form of contaminants in sewage water.

It is known to the art to destroy waste by burning. A serious problem encountered with known combustion methods, however, is that hydrocarbons are released to ambient air and water. To cleanse the air of hydrocarbons released from combusted waste, scrubbers or filters are required. Such apparatus are expensive, however, and when scrubbers are used it is necessary to subsequently cleanse the contaminated water, thereby transforming the air purification problem to a water purification problem. It is particularly difficult to remove water-soluble hydrocarbons such as phenols from sewage water. The present invention relates to a method of substantially preventing the release of watersoluble hydrocarbons when burning waste.

The majority of lime and cement furnaces, for example, are fired with oil, in certain instances combined with powdered coal. Hitherto, it has not been possible to use waste such as garbage, bark, sewage sedimentation sludge and the like, which have a relatively low potential heat content of waste can be utilized in an economically favourable manner. The method according to the invention is mainly characterized by gasifying the waste in a gas generator and by combusting the gas obtained thereby.

Figure 2:
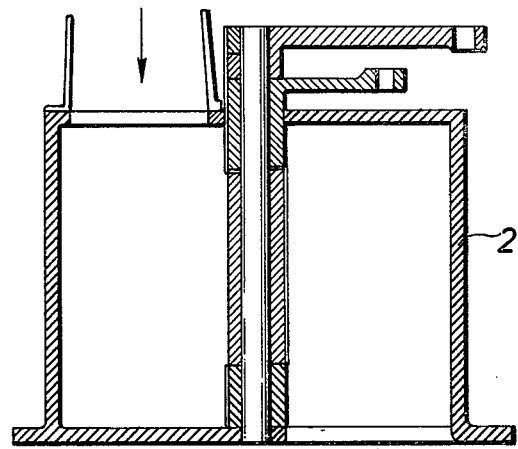
Figure 4:
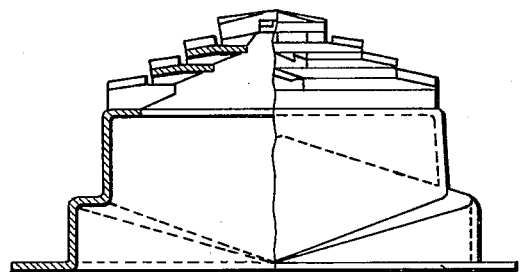
Figure 3:
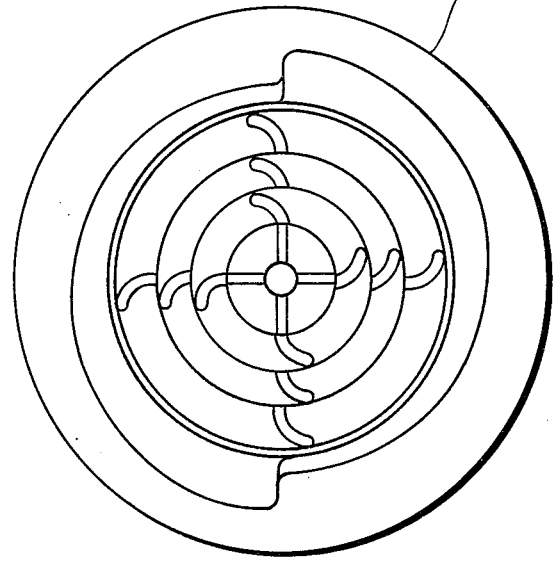

So that the invention may be more readily understood and further features thereof made apparent, the invention will now be described with reference to the accompanying drawings, in which FIG. 1 shows diagrammatically a plant according to the invention for gasifying and combusting waste, FIG. 2 shows a rotary vane feeder for charging waste to a gas generator, FIG. 3 shows a rotary grate in a gas generator, FIG. 4 illustrates a cross section of a rotary grate, and FIG. 5 illustrates diagrammatically a further plant according to the invention for gasifying and combusting waste.

With the illustrated embodiment of FIG. 1, the waste is fed to a drying apparatus 1 in which the moisture content of the waste is reduced, whereafter the waste if fed by means of a rotary vane feeder 2 to a gas generator 3, in which the waste is gasified. The rotary vane feeder 2 is constructed in a manner such that only the amount of gas capable of leaking through the seals is able to pass back to the drying apparatus 1.

The gas generator 3 is provided with a rotatable grate 4, which is so strongly constructed that the waste can be broken down by impact without damage to the grate, despite the possible occurrence of metal in the scrap. The air required to generate a gas is introduced to the gas generator through a fan 5.

In order to obtain as uniform a gas quality as possible, despite the fact that the moisture content of the waste may vary greatly, and in order to separate water containing water-soluble hydrocarbons, the generated gas is passed through a gas cooler 6 and an electric filter 7, where tar and water are separated. The separated products are passed to a sedimentation tank 8, from which water containing water-soluble carbons is passed to a steam generator 9, in which the water containing the dissolved hydrocarbons is vaporized, whereafter the water vapour is passed back to the gas generator 3.

Subsequent to having passed through the gas cooler 6 and the electric filter 7, the gas generated in the gas generator 3 is passed into a steam generator 10, where the gas is combusted and steam for heating purposes or for generating power is produced. The gases obtained in the steam generator 10 are passed through a heat exchanger 11 and an electric filter 12 before being released to atmosphere through a chimney 13.

Air is heated in the heat exchanger 11 for drying the waste in the drying apparatus 1. Subsequent to having passed through the drying apparatus, the air is passed through a condensor 15 where water absorbed by the air is condensed and removed. The pressure required to circulate the drying air is obtained from a fan 14 incorporated in the air conduit system.

With the plant illustrated in FIG. 5, waste is introduced through an inlet 21, to a rotary vane feeder 22. If desired, the inlet 21 may be provided with a known drying apparatus (not shown) in which the moisture content of the waste is reduced. The rotary vane feeder introduces the waste into a gas generator 23, in which the waste is gasified. The gas generator 23 is constructed in a manner such that only the amount of gas able to leak through the seals can pass back to the inlet 21.

The gas generator 23 is provided with a rotatable grate 24, which is so robustly dimensioned that the waste can be satisfactorily broken up by impact, despite the possible occurrence of heavy impact forces due to metal embodied in the scrap. The air required by the gas generator for combusting waste charge thereto is introduced to the generator by a fan 25.

The gas generated in the gas generator is passed therefrom to one or more burners 27 arranged in a combustion chamber 30, the burners suitably having the form of pipes extending around a known burner 28 constructed for such fuel as fuel oil or powdered coal for example, which with the illustrated embodiment are fed from a diagrammatically illustrated unit 29 of known type.

By gasifying the waste in a gas generator prior to the combustion step, a small air surplus is required in the combustion chamber to burn said fuel, when combusting, for example, fuel oil which is injected into the combustion chamber directly through burners, or powdered coal which is blown into the combustion chamber through burners, a large air surplus is required. Thus, with the method according to the invention the air surplus required for the combustion of oil or powdered coal can be utilized in an economically advantageous manner.

We claim:

1. In a method for the destruction of waste by generating gas from the waste in a gas generator and delivering the gas to a combustion chamber for combustion thereof, the improvement comprising separating water-soluble hydrocarbons from the generated gas and continuously recycling said water-soluble hydrocarbons by returning said hydrocarbons to the gas generator prior to the combustion of the generated gas.

2. In a method for the destruction of waste by generating gas from the waste in a gas generator and delivering the gas to a combustion chamber for combustion thereof, the improvement comprising separating water-soluble hydrocarbons from the generated gas and continuously recycling said water-soluble hydrocarbons by returning said hydrocarbons together with condensed and separated water to the gas generator prior to the combustion of the generated gas.

3. The method of claim 1, further including volatilizing the generated water-soluble hydrocarbons, and burning the same in the gas generator.

4. The method of claim 2, wherein the step of generating the gas includes combustion of waste in the gas generator, and further including the step of evaporating the separated water-soluble hydrocarbons prior to returning the same to the gas generator whereby the vaporized hydrocarbons may be burned in the gas generator.

* * * * *